(12) United States Patent
Fleming

(10) Patent No.: US 7,895,370 B2
(45) Date of Patent: Feb. 22, 2011

(54) METHOD AND APPARATUS TO DEFER USB TRANSACTIONS

(75) Inventor: Bruce Fleming, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 12/347,066

(22) Filed: Dec. 31, 2008

(65) Prior Publication Data

US 2010/0169522 A1   Jul. 1, 2010

(51) Int. Cl.
    *G06F 3/00*   (2006.01)
(52) U.S. Cl. ......................... 710/18; 713/320
(58) Field of Classification Search ................. 710/260, 710/262, 18; 713/320
    See application file for complete search history.

(56) References Cited

U.S. PATENT DOCUMENTS

| 6,249,739 | B1 | 6/2001 | Noehring et al. |
| 6,622,244 | B1 | 9/2003 | Eidson et al. |
| 7,249,253 | B2 | 7/2007 | Eidson et al. |
| 7,281,074 | B2 | 10/2007 | Diefenbaugh et al. |
| 2007/0005824 | A1 | 1/2007 | Howard |
| 2007/0005859 | A1 | 1/2007 | Diefenbaugh et al. |
| 2007/0219751 | A1 | 9/2007 | Huang |
| 2008/0005445 | A1 | 1/2008 | Diefenbaugh et al. |

*Primary Examiner*—Clifford H Knoll
(74) *Attorney, Agent, or Firm*—KED & Associates, LLP

(57) ABSTRACT

An apparatus and method are provided that include providing a transaction data structure, and monitoring the transaction data structure for a predetermined amount of time. A link between a bus device and a host controller may be provided into a low power state in response to the monitored transaction data structure.

15 Claims, 4 Drawing Sheets

METHOD AND APPARATUS TO DEFER USB TRANSACTIONS

BACKGROUND

1. Field

Embodiments of the present invention may relate to computer systems.

2. Background

A computer system may be equipped with a universal serial bus (USB). USB ports may allow USB-enabled devices to connect and communicate with the computer system. Examples of electronic devices that communicate with computer systems through USB ports include digital cameras, keyboards, hard drives, and printers.

A USB host controller may be in charge of a USB bus in a computer system. The USB host controller may be a collection of software and hardware inside the computer system that supports the USB bus. The USB host controller may be responsible for identifying devices that are connected to a USB port. The USB host controller may load needed device drivers dynamically. The USB host controller may also periodically poll each of the attached devices for data communications.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
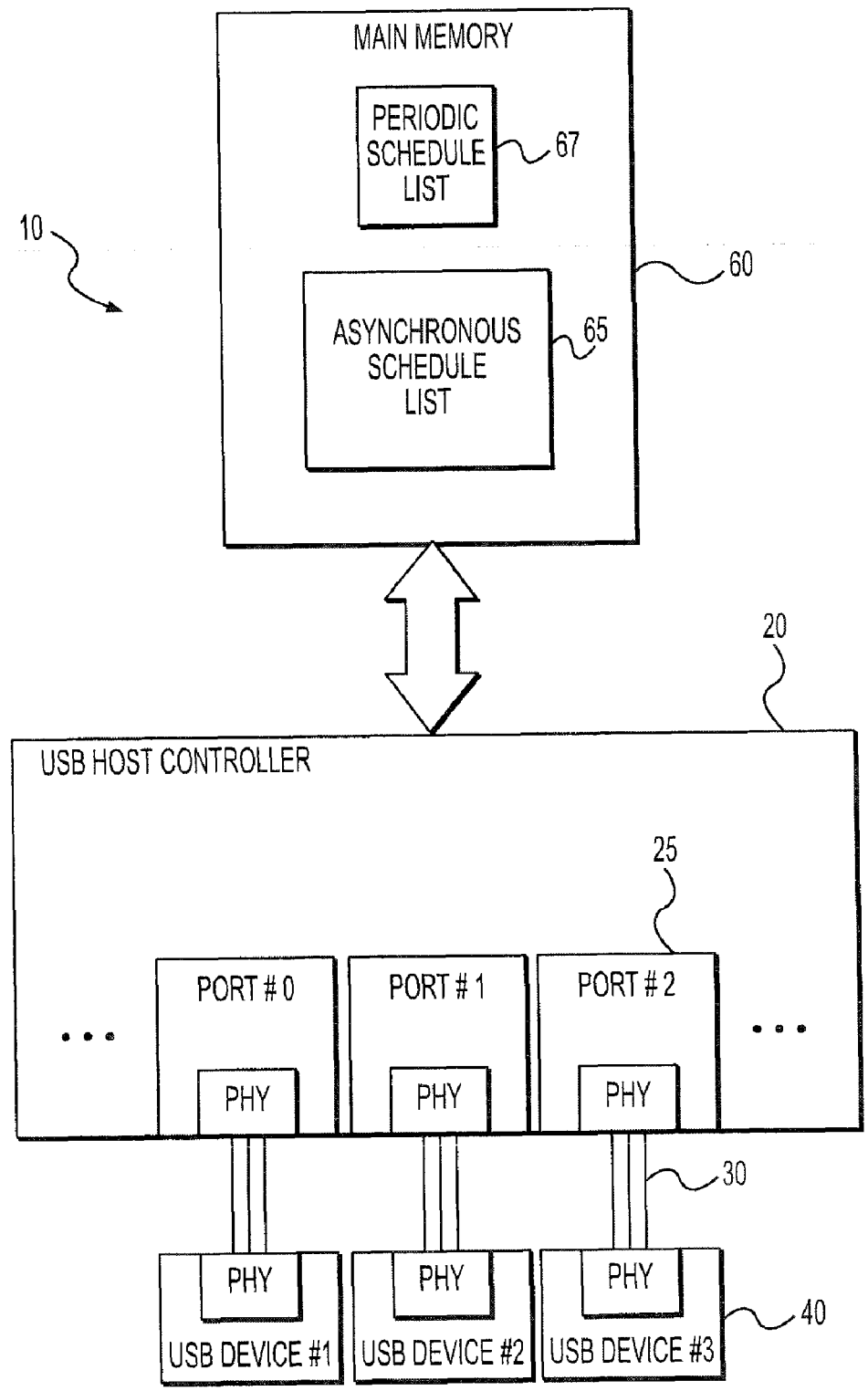
FIG. 1 is a diagram of a computer system that supports a universal serial bus (USB) according to an example arrangement.

Power issues may be a problem for platforms and systems, such as USB systems. As one non-limiting example, Link Power Management (LPM) may be used to deal with power issues. LPM may allow a low latency entry and exit of low power link states for USB devices that may allow frequent use of low power link and device states. Other types of power management techniques may also be used.

Embodiments of the present invention may relate to an LPM-enabled USB host controller, a microcontroller with direct access to register space of the USB host controller and a USB host controller driver. The microcontroller may autonomously manage the LPM. Although the description may relate to a USB host controller, a USB host controller driver and a microprocessor, each of these devices may be separately provided as logic components. For example, logic may be provided to form and operate the USB host controller, logic may be provided to form and operate the USB host controller driver and logic may be provided to form and operate the microprocessor.

USB is a polling based architecture that has an associated platform level power impact. For example, a USB host controller may poll a USB device to determine if the device can accept a given transaction, such as at frequencies of up to 7 μsec. Each time the USB host controller issues a transaction, the USB host controller may access data structures stored in a main memory, issue the transaction and then update the data structures in the main memory based on a response from the USB device. This activity may keep components of the platform unnecessarily active and accordingly may waste power. In order to stop or reduce this activity, a selective suspend may be provided to the USB device. The USB device may subsequently be made available for a transaction by using a remote wake. However, selective suspending of a USB device may not be acceptable for active power management since entry and exit time latencies of the USB device may be quite long, such as several hundreds of milliseconds, for example.

Embodiments of the present invention may determine when an active USB interface/port is not accepting transactions and is not actively transferring data across a link between the USB device and the USB host controller. The detection of this state may occur in sub-1 millisecond timeframes, for example. Embodiments of the present invention may include a USB host controller driver (or logic) that informs a microcontroller when a transaction is added to an asynchronous scheduler list (i.e., when the transaction has been issued). The microcontroller (or logic) may monitor specified transactions by monitoring or inspecting queue heads (QH) and transaction descriptors (TD) of the asynchronous schedule list. This monitoring may occur on a microframe basis, for example. Stated differently, the microcontroller or corresponding logic may monitor a transaction data structure (from an issued transaction) for a prescribed amount of time.

As a result of the monitoring, if no data transfer activity exists on the queue head (QH) after a predetermined number of microframes the microcontroller (or logic) may forward an event targeted at the USB host controller driver. The event may be in the form of an Advanced Configuration and Power Interface (ACPI) General Purpose Event (GPE) or an interrupt request. In response, the USB host controller driver (or logic) may request an LPM transaction for a specified port. Once the LPM transaction is completed, an active bit in the specified transaction may be cleared (or the bit may be changed). This may place the link between the USB device and the USB host controller into a quiescent state.

Embodiments of the present invention may relate to handling of device initiated resumes from a link that is currently in a sleep state (or L1). When an LPM transaction is issued to a USB device, the USB host controller (or logic) may inform the microcontroller of the issuance of the transaction and the USB host controller may provide an address (or addresses) to the microcontroller of all affected queue heads (QHs). When a device initiated resume occurs on the port associated with these queue heads (QH), the microcontroller may set the active bit on all the queue heads (QHs) for the port that generated the resume. This may cause the USB host controller to issue deferred transactions to the USB device with no additional interaction (or introduction of additional latency) with the host controller driver.

A deferred transaction may be a transaction that is being monitored as described above. Once a LPM transaction is accepted by the USB device, the transactions that had the active bit cleared have been deferred until the USB device indicates that it is capable of satisfying the request. This may be signaled to the USB host controller by the resume.

The implementation of deferring may be exclusively based on the host controller driver. The host controller driver may defer transactions when a link has been idle for extended periods of time (in excess of 100 mS) without incurring a measurable effect on residency and battery life. Embodiments of the present invention may provide fine granularity of monitoring idle transactions and increase usage of LPM. This may increase residency of a link in a low power state and reduce overall power for an entire platform. Transaction idle threshold monitoring may also be done by the USB host controller adding additional information in the queue head (QH) that the host controller utilizes. Embodiments of the present invention may also use the microcontroller (or logic) to set an active bit in the deferred transaction thus reducing latency of issuing a deferred transaction to the USB device.

In at least one embodiment, the resume request from the USB device may be received while the system is in a very low power state. One benefit of having the microcontroller (or logic) set the active bit in the appropriate transactions is that the transaction may be issued to the USB device and completed in parallel with the rest of the system getting to an operational state and thus hiding latency of the deferred transaction being issued and completed.

FIG. 1 is a diagram of a computer system that supports a universal serial bus (USB) according to an example arrangement. Other arrangements may also be provided. As shown, a computer system 10 may include a USB host controller 20 (or logic) and one or more USB ports 25. FIG. 1 also shows a plurality of USB devices 40. A physical layer (PHY) may be provided on both the USB port 25 and the USB device 40 for communicating data over a link 30 between the USB port 25 and the USB device 40. Each USB device 40 may communicate over a separate link with the USB host controller 20. FIG. 1 also shows that a main memory 60 (or system memory) may include an asynchronous schedule list 65 and a periodic schedule list 67.

The USB host controller 20 may service asynchronous transfers (from the asynchronous schedule list 65) when they occur using the channel bandwidth remaining after periodic transfers (from the periodic schedule list 67). The asynchronous schedule list 65 may be a circular linked list of schedule work items that provides a round-robin service opportunity for asynchronous transfers. The schedule work items include one or more queue heads. Each queue head may represent a single (bulk or control) transfer corresponding to a specific endpoint. An endpoint is a logical entity residing on the USB device 40 requiring service. The queue head may include transfer descriptors associated with the corresponding queue head. Each transfer descriptor may represents a discrete amount of work (i.e., data to either transmit to, or receive from, a specific endpoint using one or more transactions) to occur over the corresponding USB link 30. The queue heads may be provided in transaction data structures.

The USB host controller 20 may traverse the circular linked list of queue heads and execute a transaction associated with the queue head.

As the asynchronous schedule list 65 is traversed, transactions may be executed on the USB and an endpoint that is not currently ready to consume or produce data may return a not ready (NAK) response or may return a not yet (NYET) signal. Servicing the asynchronous schedule list 65 may include frequent accessing of the main memory 60 by the USB host controller 20 to schedule data structures.

The USB 2.0 protocol may be effective in moving large amounts of data. The USB 2.0 protocol may provide a flow control mechanism where a USB device responds with a NAK response to a transaction and leaves the decision about when to retry to the USB host controller 20. The USB host controller 20 may attempt to resume the data stream by issuing another transaction request to move data at the earliest opportunity (e.g., the very next transaction on the bus).

However, mismatches may occur between the available bandwidth of the USB host controller 20 and the USB device 40. The USB 2.0 protocol may not provide a mechanism for USB devices to asynchronously notify the USB host controller 20 that data is ready for transfer or space is available to accept data. This may result in long periods where the USB host controller 20 repeatedly polls USB devices to determine when they are ready to either produce or consume data. This polling may result in multiple accesses to the main memory 60 by the USB host controller 20 for such tasks as reading from the asynchronous schedule list 65 and writing back a status of the transfer. These periods of high transaction activity that have little or no real data being transferred may lead to inefficiencies in power consumption by the USB host controller 20.

Frequent polling may improve responsiveness of the computer system and may reduce an amount of buffering (data storage) required on the USB device. However, a USB device with a low data transfer rate or having an indeterminate time of data arrival (such as a networking device) may respond to multiple polling requests with a not ready (or NAK) response until the device is ready to move data. These cycles of polling requests and not ready responses may result in inefficiencies in the platform with respect to power consumption.

This frequent polling of USB devices and frequent access to the main memory 60 by the USB host controller 20 may cause more power to be consumed by the USB host controller 20, the USB ports 25 and the USB devices 40, as well as defeat other power reduction schemes implemented in the computer system. Although the reliance on the main memory 60 may be a cause of power management issues, a change to the role of the USB host controller 20 or the main memory 60 may negatively impact the existing software infrastructure.

Figure 2:
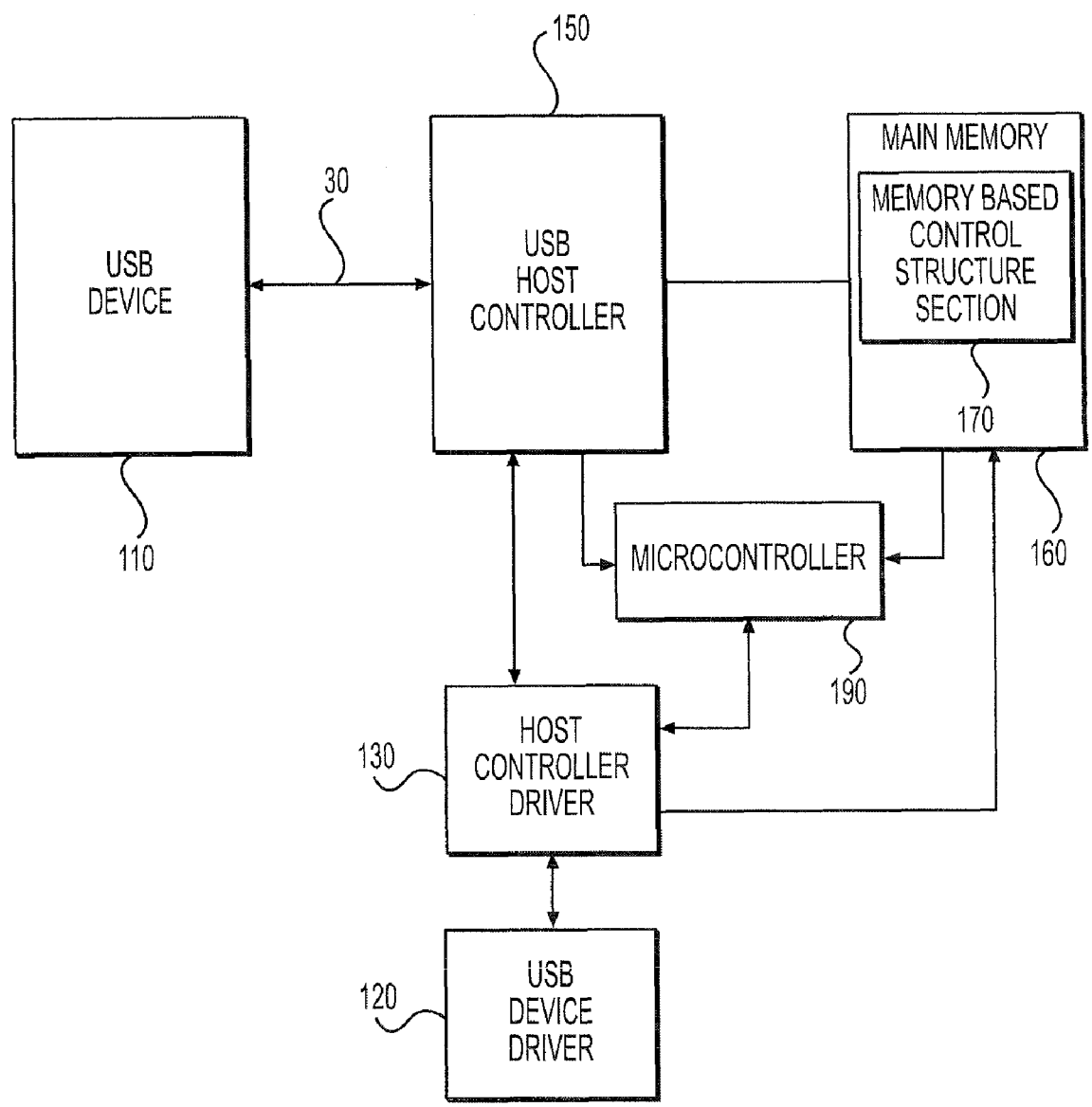
FIG. 2 is a diagram of a computer system according to an example embodiment of the present invention.

During attachment of a USB device to a USB port of a USB host controller, the associated USB device driver may perform various operations as discussed below with respect to FIG. 2. That is, FIG. 2 is a diagram of a computer system according to an example embodiment of the present invention. Other embodiments and configurations are also within the scope of the present invention.

FIG. 2 shows a computer system 100 that includes a USB device 110, a USB device driver 120 (or logic), a host controller driver 130 (or logic), a microcontroller 190 (or logic), a USB host controller 150 (or logic), and a main memory 160 (or system memory) that stores information in a memory based control structure section 170. Although not specifically shown in FIG. 2, the main memory 160 may include an asynchronous schedule list and a periodic schedule list. The USB host controller 150 may operate in accordance with Link Power Management (LPM), for example. Other power management implementations may also be used. The USB host controller 150 may correspond to the USB host controller 20 shown in FIG. 1 and the USB device 110 may correspond to one of the USB devices 40 shown in FIG. 1.

The USB device driver 120 may request the USB host controller driver 130 to schedule (or issue) a transaction for an associated USB device, such as the USB device 110. The host controller driver 130 may then update data of the memory based control structure section 170 in the main memory 160. This may include providing a transaction data structure corresponding to the issued transaction.

The host controller driver 130 may inform the microcontroller 190 of a deferrable transaction. The host controller driver 130 may provide a pointer to a queue head for the deferrable transaction. The method of providing the pointer to the microcontroller 190 may be a memory-mapped input/output (MMIO) space associated with the USB host controller 150 or may be an Inter-Processor Communication (IPC) mechanism.

The host controller 150 may review data from the memory based controller structure section 170 of the main memory 160 and issue transactions to USB devices on a periodic basis.

The USB device 110 may respond to a targeted transaction by providing a not ready (NAK) response for the transaction when the USB device 110 is unable to fulfill the transaction request.

The microcontroller 190 may monitor (or inspect) queue heads for all transactions that are deferrable. This monitoring may be on a multi-microframe basis. The monitoring by the microcontroller 190 may include comparing a previous value of a "Total bytes to transfer" field of the queue head (QH) to determine if any data has been transferred. Accordingly, the microcontroller 190 (or logic) may monitor a transaction data structure for a prescribed amount of time.

When an idle threshold is exceeded for a given queue head (or a transaction data structure), the microcontroller 190 may issue an interrupt to the host controller driver 130 indicating that the idle threshold limit has been reached. For example, the idle threshold may be determined based on a specified number of microframes that have elapsed without any data transfer.

The host controller driver 130 may then request an LPM transaction to the host controller 150, which may issue the LPM transaction to the USB device 110. When the USB device 110 responds to the transaction request with an acknowledge (ACK) signal, the host controller driver 130 (or logic) may clear an active bit on the corresponding queue head. The microcontroller 190 may then recognize that the transaction has been deferred during the monitoring by the microcontroller 190. Accordingly, logic may provide the link (between the USB device 110 and the host controller 150) in a low power state based on the monitored transaction data structure.

When the USB device 110 is ready to transfer data, the USB device 110 may generate a resume sequence (or resume signal) on the USB link 30. This may generate a port status change interrupt that is received by the microcontroller 190.

The microcontroller 190 may match the port that generated the resume sequence (or resume signal) with a port number field of a deferred transaction and set the active bit in the corresponding queue head (QH) to allow the USB host controller 150 to reissue a transaction request. Accordingly, the microcontroller 190 (or logic) may modify the transaction data structure by changing a bit to active in response to the receiving the resume from the USB device 110.

The host controller 150 (or logic) may then issue the activated transaction to the USB device 110. The USB device 110 may acknowledge (ACK) the transaction and transfer the data. The host controller 150 may, in turn, generate a completion interrupt to the host controller driver 130 (via the microcontroller 190). The completion interrupt may propagate to the USB device driver 120. Accordingly, the transaction may be reactivated in response to the changed bit of the transaction data structure.

Figure 3:
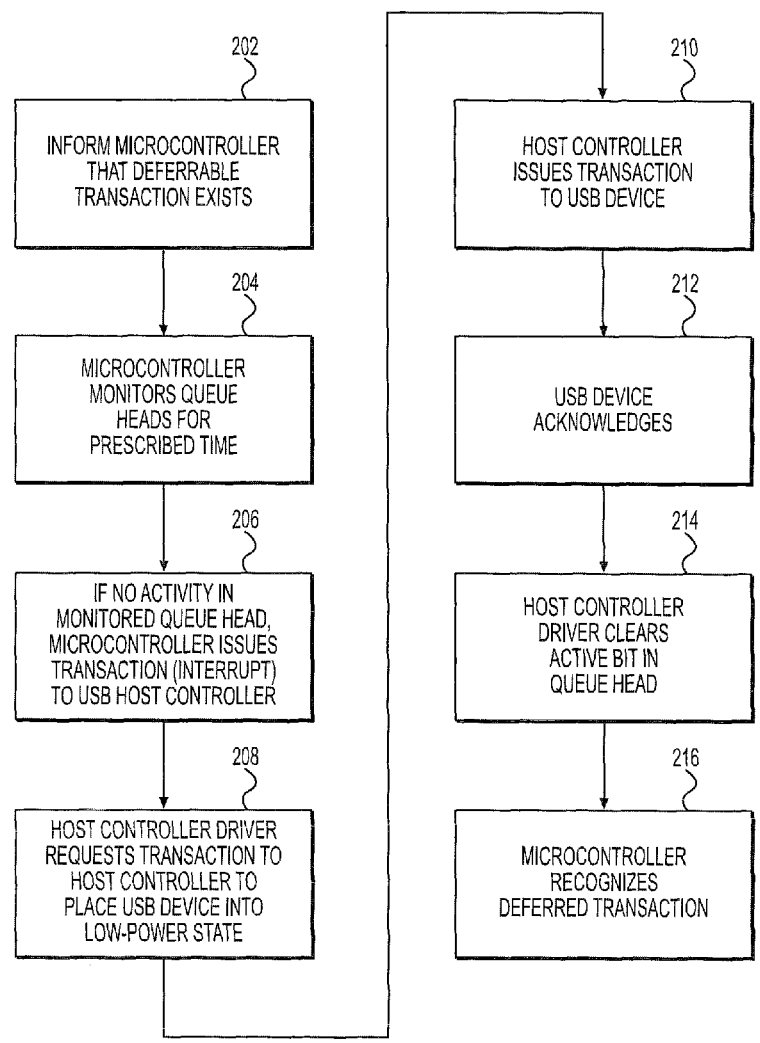
FIG. 3 is a flowchart of operations according to an example embodiment of the present invention.

FIG. 3 is a flowchart of operations according to an example embodiment of the present invention. Other operations, orders of operations and embodiments are also within the scope of the present invention.

More specifically, FIG. 3 shows that a microcontroller (or logic) may be informed in operation 202 that a deferrable transaction exists. This occurs after the issuance of a transaction. In operation 204, the microcontroller (or logic) may monitor queue heads (of a transaction data structure) for a prescribed amount of time. The queue heads may be provided in a schedule list. The queue heads may also identify a deferrable transaction. If no activity occurs in the monitored queue heads for the prescribed amount of time, then the microcontroller (or logic) may issue a transaction (i.e., an interrupt) to the USB host controller in operation 206. Stated differently, an interrupt may be provided to the USB device based on a monitored amount of activity across a link between the USB device and the USB host controller.

In operation 208, the host controller driver (or logic) may request a transaction to the USB host controller to place the USB device into a low power state. That is, a link between the USB device and the USB host controller may be provided into a low power state in response to the monitored transaction data structure. The USB host controller (or logic) may issue the transaction to the USB device in operation 210. In operation 212, the USB device may provide an acknowledge (or acknowledge signal) that is received by the USB host controller. The host controller driver (or logic) may clear the active bit in the corresponding queue head in operation 214, and the microcontroller may recognize the deferred transaction in operation 216.

Figure 4:
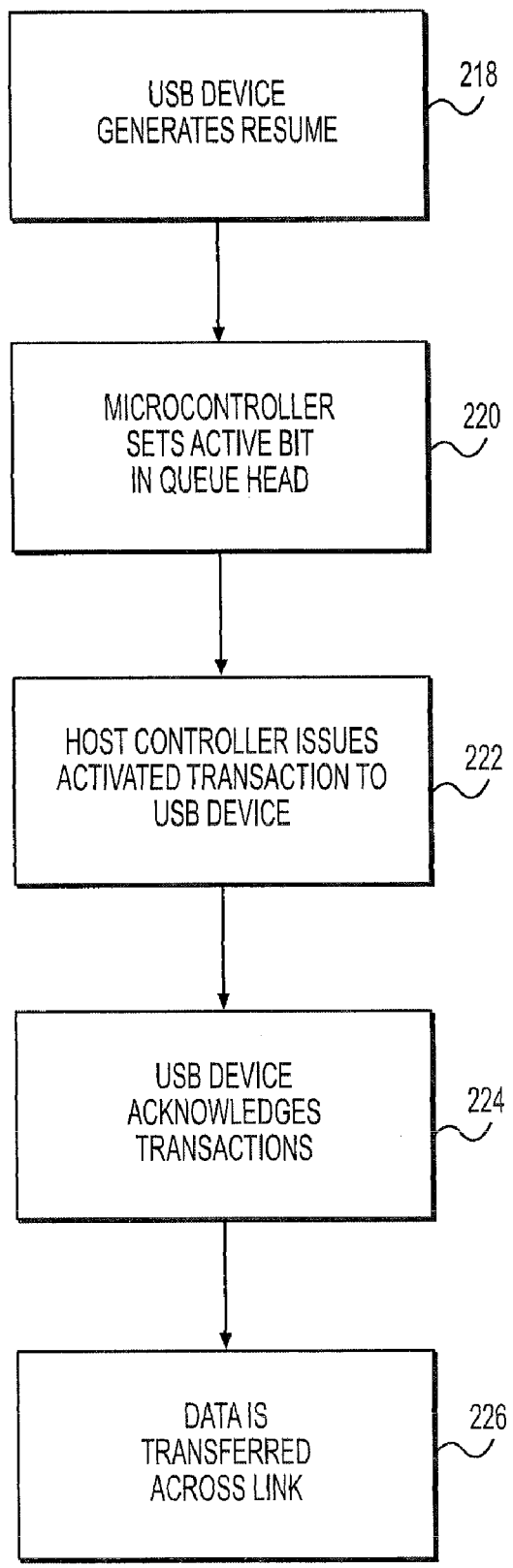
FIG. 4 is a flowchart of operations according to an example embodiment of the present invention.

FIG. 4 is a flowchart of operations according to an example embodiment of the present invention. Other operations, orders of operations and embodiments are also within the scope of the present invention.

More specifically, FIG. 4 shows that the USB device may generate a resume (or resume signal) in operation 218 that is received by the USB host controller. In operation 220, the microcontroller (or logic) may set (or change) an active bit in the corresponding queue head to indicate an active status. This may be based on the resume that is received from the USB device. The USB host controller (or logic) may issue a reactivated transaction to the USB device in operation 222. The reactivated transaction may be issued to the USB device in response to the changed active bit. In operation 224, the USB device may acknowledge the transaction. Data may then be transferred across the link between the USB device and the USB host controller in operation 226. The data transfer is based on the issued reactivated transaction.

Embodiments of the present invention may allow a low power microcontroller or logic to provide a monitoring capability for a USB host controller driver. The microcontroller may notify the USB host controller driver when idle thresholds have been exceeded. This may reduce overhead of a main processor and increase usefulness of LPM when a link is idle for extended periods of time, such as on the order of 10-15 milliseconds.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
   logic to issue a transaction;
   a microprocessor to monitor a queue head of a transaction data structure for the issued transaction for a prescribed amount of time; and
   logic to provide a link between a bus device and a host controller in a low power state based on the monitored transaction data structure, the microprocessor to modify the transaction data structure for the issued transaction to indicate that the transaction is deferred by changing a bit of the transaction data structure, and the microprocessor to modify the transaction data structure for the issued transaction to indicate the transaction is active by changing a bit of the transaction data structure.

2. The apparatus of claim 1, wherein the bus device comprises a universal serial bus (USB) device.

3. The apparatus of claim 1, further comprising logic to receive a resume from the bus device.

4. The apparatus of claim 3, wherein the microprocessor to modify the transaction data structure for the issued transaction to indicate that the transaction is active in response to the logic to receive the resume from the bus device.

5. The apparatus of claim 4, wherein the microprocessor changes the bit of the transaction data structure for the issued transaction in response to receiving the resume from the bus device.

6. The apparatus of claim 5, further comprising logic to reactivate the transaction in response to the changed bit of the transaction data structure.

7. The apparatus of claim 6, further comprising logic to transfer data across the link to the bus device based on the reactivated transaction.

8. The apparatus of claim 1, wherein the logic to provide the link in the low power state comprises a host controller.

9. The apparatus of claim 1, wherein the link is provided in the low power state when the logic to monitor the transaction data structure determines that no data has moved across the link for the prescribed amount of time.

10. A method comprising:
    providing a transaction data structure for a transaction;
    monitoring a queue head of the transaction data structure for the transaction for a predetermined amount of time;
    providing a link into a low power state in response to monitoring the queue head of the transaction data structure for the transaction, the link provided between a bus device and a host controller;
    modifying the transaction data structure to indicate that the transaction corresponding to the transaction data structure is deferred by changing a bit of the transaction data structure; and
    modifying the transaction data structure to indicate that the transaction corresponding to the transaction data structure is active by changing a bit of the transaction data structure.

11. The method of claim 10, wherein the transaction data structure for the transaction is modified to indicate that the transaction is active in response to receiving a resume from the bus device.

12. The method of claim 10, further comprising reactivating the transaction corresponding to the transaction data structure in response to the changed bit of the transaction data structure.

13. The method of claim 10, wherein the link is provided in the low power state when the monitoring determines that no data has moved across the link for the prescribed amount of time.

14. The method of claim 10, wherein monitoring the queue head includes a microprocessor monitoring the queue head of the transaction data structure.

15. The method of claim 14, wherein the modifying is performed by the microprocessor.

* * * * *